United States Patent [19]

Oliphant

[11] Patent Number: 4,878,476
[45] Date of Patent: Nov. 7, 1989

[54] PORTABLE BARBECUE GRILL ASSEMBLY

[76] Inventor: Adam L. Oliphant, 1452 D Street, N.E., Washington, D.C. 20002

[21] Appl. No.: 355,620

[22] Filed: May 22, 1989

[51] Int. Cl.⁴ ................................................ F24C 1/16
[52] U.S. Cl. .................................. 126/9 R; 126/25 R
[58] Field of Search ...................... 126/25 R, 9 R, 9 B

[56] References Cited

U.S. PATENT DOCUMENTS

3,611,912 10/1971 Choc ..................................... 126/9 R
4,706,642 11/1987 Sims et al. ........................... 126/9 R Primary Examiner—Carroll B. Dority
Attorney, Agent, or Firm—David H. Semmes

[57] ABSTRACT

Portable barbecue assemblies capable of being folded into attache type carrying case configuration, particularly a barbecue grill assembly capable of baking smoking and grilling in the assembled mode and in the disassembled mode capable of being formed into an attache case configuration of convenient carrying. The unit is characterized by its highly rigidized assembly, its dual baking and grilling capabilities, as well as the adjustability of its top cover as windshield, a shelf or a baking oven closure, as well as the adjustability of the interior grates for varying types of grilling and cooking.

11 Claims, 8 Drawing Sheets

PORTABLE BARBECUE GRILL ASSEMBLY

CROSS-REFERENCES TO RELATED APPLICATIONS:

An improvement upon applicant's PORTABLE COOKING GRILL (Patent No. 4,646,711).

BACKGROUND OF THE INVENTION:

Field of the Invention:

Portable cooking grills, particularly grills which may be disassembled and nested together for backpacking or handcarrying.

The invention is characterized by its portability when disassembled into an attache carrying case configuration and its rigid structure in its assembled mode with the dual capability of serving both as a cooking grill, oven and smoker.

SUMMARY OF THE INVENTION:

A portable barbecue grill assembly capable of being folded into an attache carrying case type configuration comprising a rectangular top cover in the form of an attache case and a cooking oven releaseably supporting said rectangular top cover, said cooking oven including a rectangular base pan, left and right hand standing sides hingedly connected to the base pan and an upstanding back hinged to the base pan, as well as a front door releaseably and pivotably secured to the base pan. A plurality of cooking grates and a baking pan are supported upon interior brackets defined in the upstanding sides and back.

Figure 1:
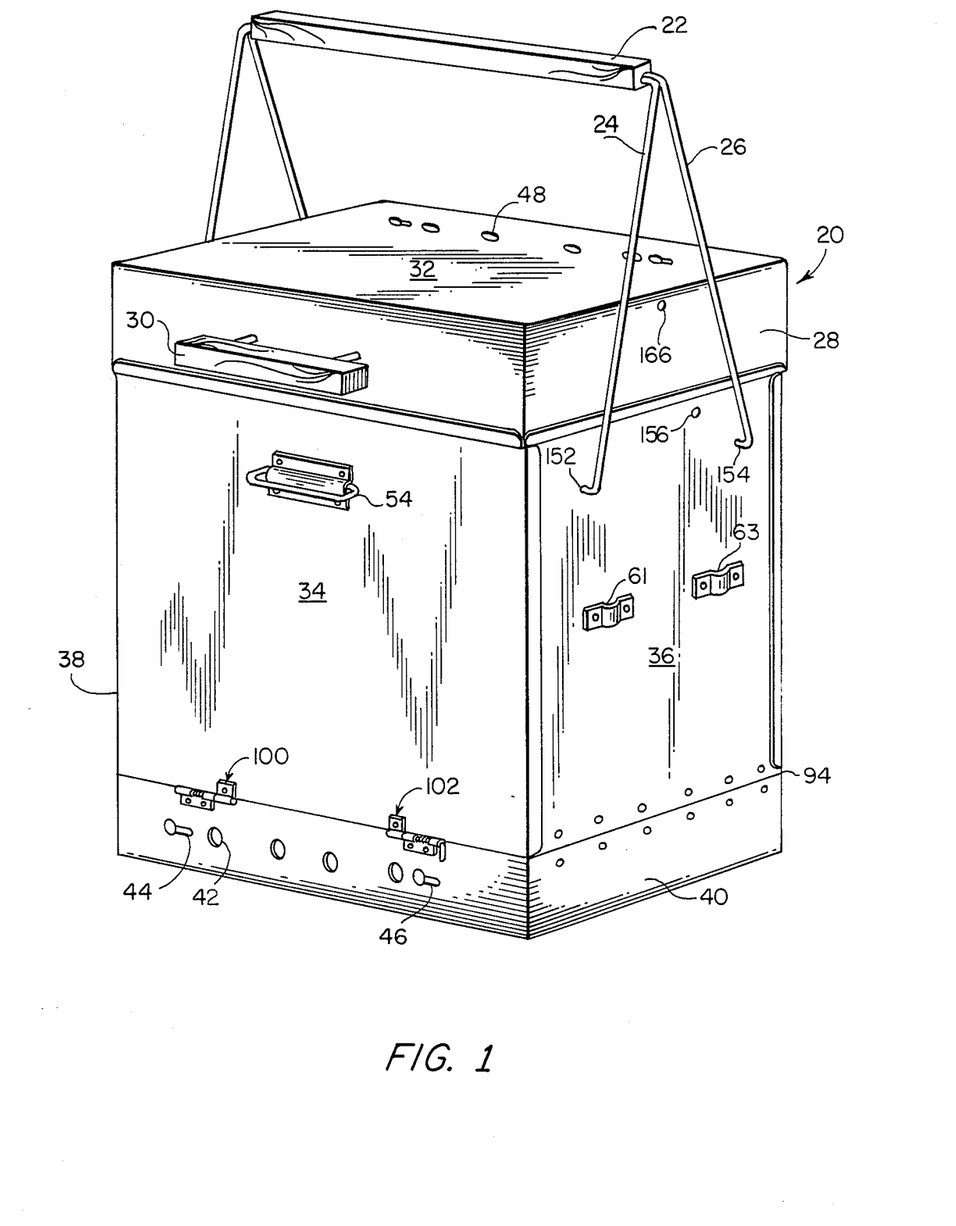
FIG. 1 is a perspective view of the portable barbecue grill assembly in assembled cooking mode.

DESCRIPTION OF THE PREFERRED EMBODIMENTS:

In FIG. 1, the portable barbecue cooking grill 20 is illustrated in cooking or grilling mode with portability afforded by wooden carrying handle 22 extending over the top of the grill and struts 24, 26 engaging pairs of holes 152, 154 defined in either side.

As illustrated, cooking grill 20 includes rectangular top 28 having closed sides and closed back 32. A wooden handle 30 mounted on struts 146, 148 and secured by stove bolts 151, 153, projects from the front side such that an attache case configuration is provided. Vent holes 48 and an appropriate venting slide (illustrated in FIG.2), may be provided.

The oven base 40 is of rectangular configuration having venting apertures 42 operated by means of venting slide handles 44, 46. A pair of upstanding sides 36, 38 is hingedly connected to oven base 40 by means of hinges 94 and 96. Upstanding back 52 is connected to the oven base by hinge 108 and front door 34 having handle 54 is removably fixed to oven base 40 by means of detent receptacles 100, 102.

Figures 2, 12:
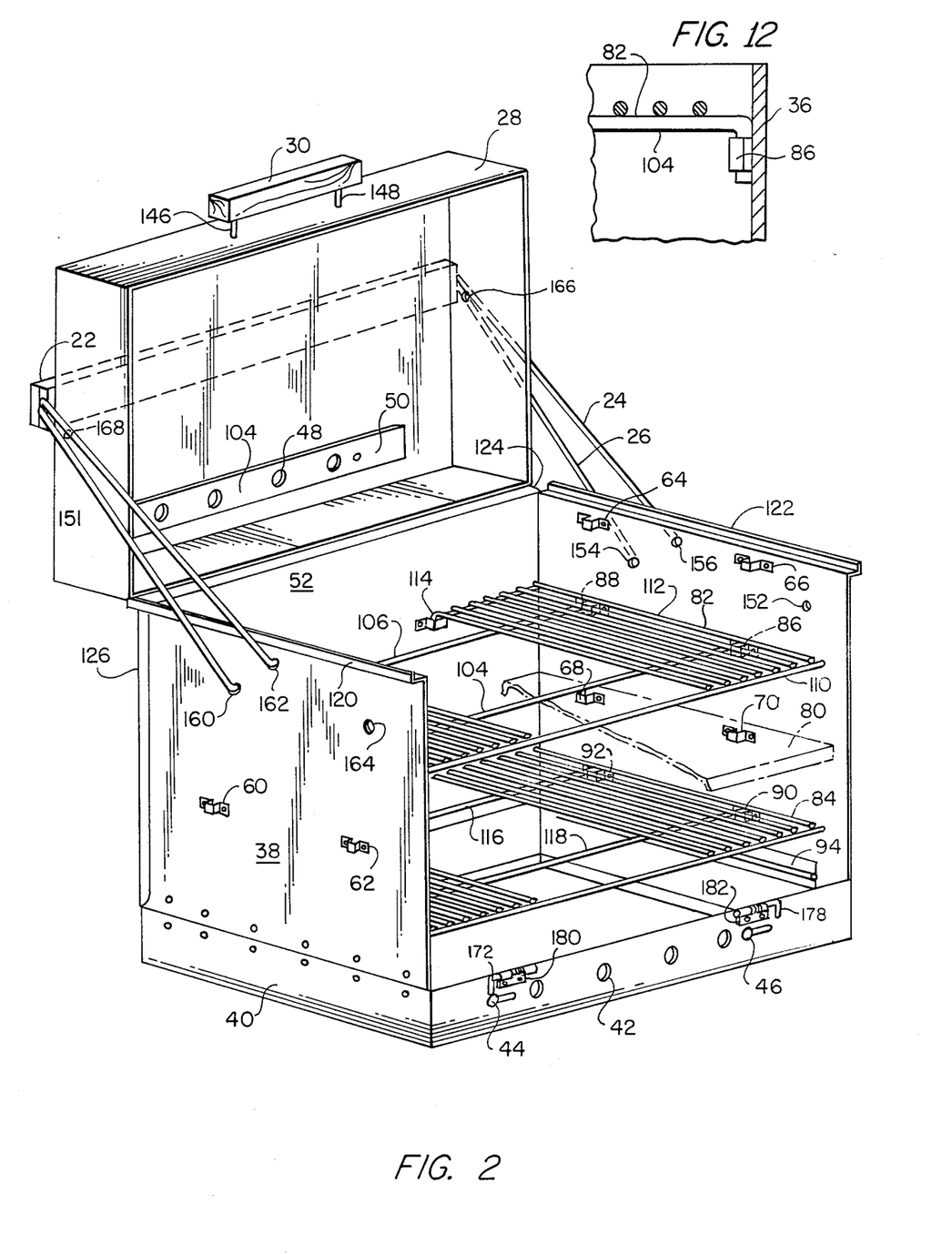
FIG. 2 is a perspective view with the front door removed, showing the portable barbecue oven in open cooking windshield mode with the rectangular top cover supported in a vertically upright position.
FIG. 12 is a fragmentary vertical section, showing jetting of grate 40 into sidewall 36.
Figure 10:
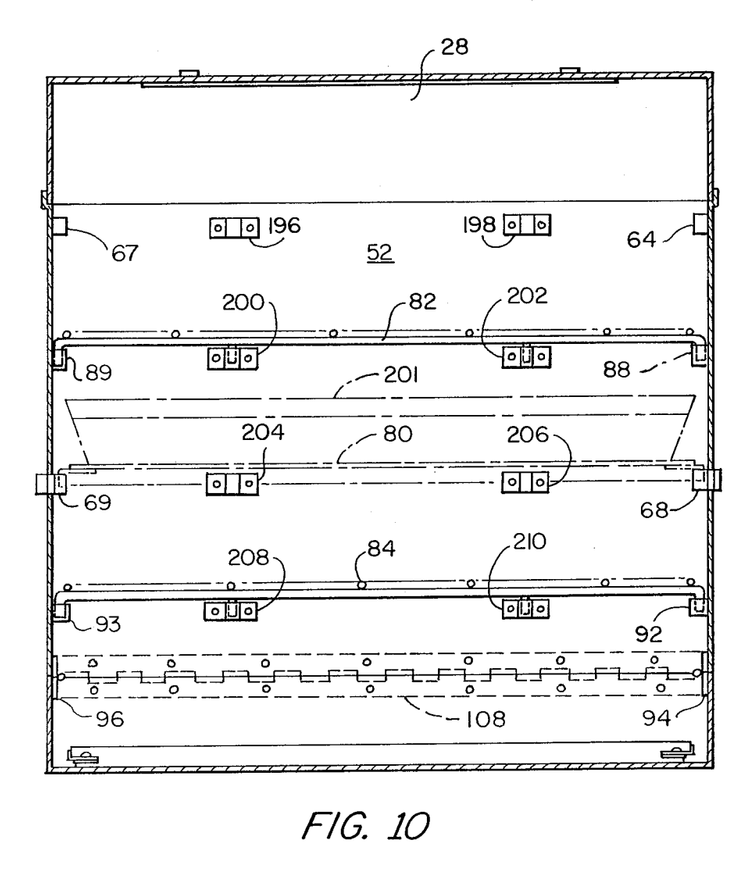
FIG. 10 is a vertical section taken from side to side, showing the positioning of the cooking grills and the baking pan on the interior brackets.

As illustrated in FIG. 2, top cover venting slide 50 includes a median portion 104 which covers the venting apertures 48 defined in rectangular top cover 28. In FIG. 2, the cooking grill is indicated in windshield mode wherein top cover 32 is held in vertical position by means of wood handle 22 and struts 24, 26 extending to pairs of holes 160, 162 and 154, 156, defined respectively, in each of the upstanding sides 38, 36. As will be apparent, exterior brackets 60, 61, 62 and 63 may be affixed respectively to upstanding sides 38 and 36. Interior bracket members may be affixed in pairs 64, 66, 86, 88, 68, 70, 90, 92 for support of fire and cooking grates and oven baffle and the like, on the interiors of the upstanding sides. Also, similar brackets 196, 198, 200, 202, 204, 206, 208 and 210 may be positioned on the interior of back member 52. As illustrated in FIGS. 2 and 10, the grates 82, 84 may include transverse or side to side members 104, 106, extending from side to side in the oven and front to back members 114. The members 104 and 106 may engage the interior brackets 86 and 88 for rigidized support of the grill as well as the sides and back. Baking pan or oven baffle 80 may be supported on brackets 68 and 70 by means of movable detents 152, 186. Alternatively baking pan 80 may be supported on the floor of the base pan either as an ash pan or in the disassembled carrying mode.

Front door 34 has been removed in FIG. 2 by means of detents 172, 178 which normally engage receiving receptacles 100, 102, attached to the bottom of the front door. Detents 172, 178 may be spring supported in bracket members 180, 182 defined at the top edge of the base pan 40. As illustrated in FIG. 2, pairs of holes 152, 154 and 160, 164, are used for supporting the struts 24, 26 in the assembled barbecue carrying mode.

Figure 3:
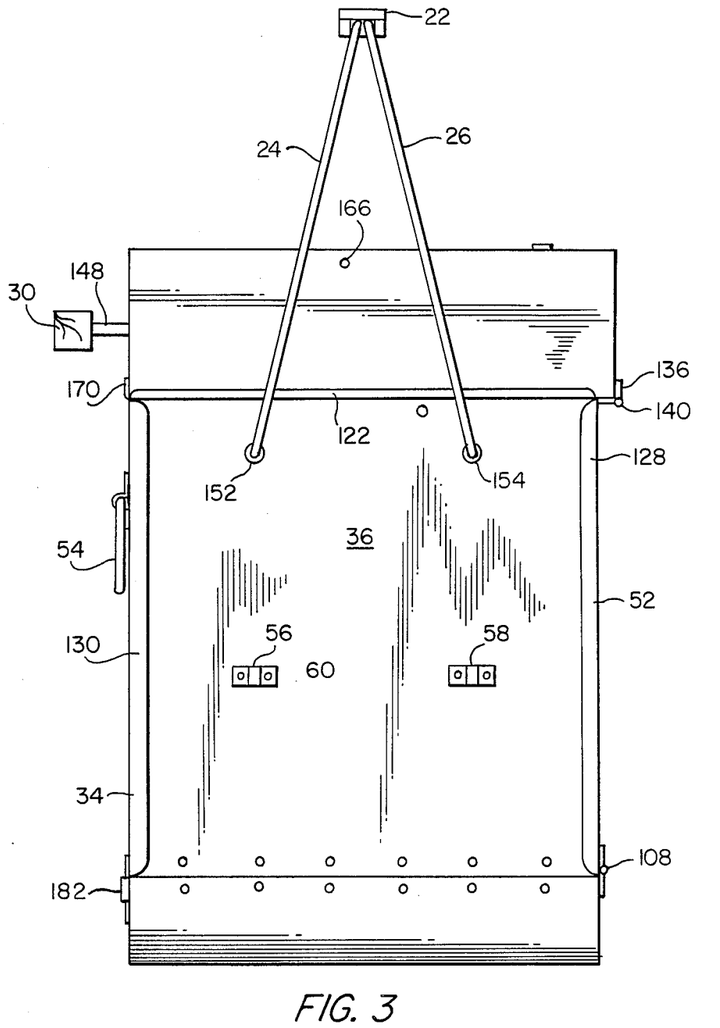
FIG. 3 is a side elevation of the cooking grill in assembled carrying mode as in FIG. 1.
Figure 4:
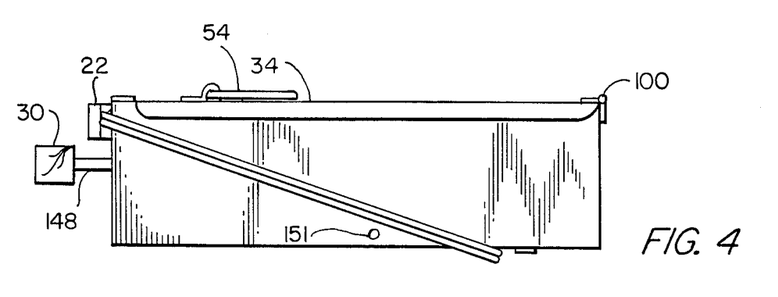
FIG. 4 is a side elevation of the device in disassembled carrying mode as in FIG. 7 with the carrying handle and struts encompassing the exterior of the rectangular top cover.
Figure 5:
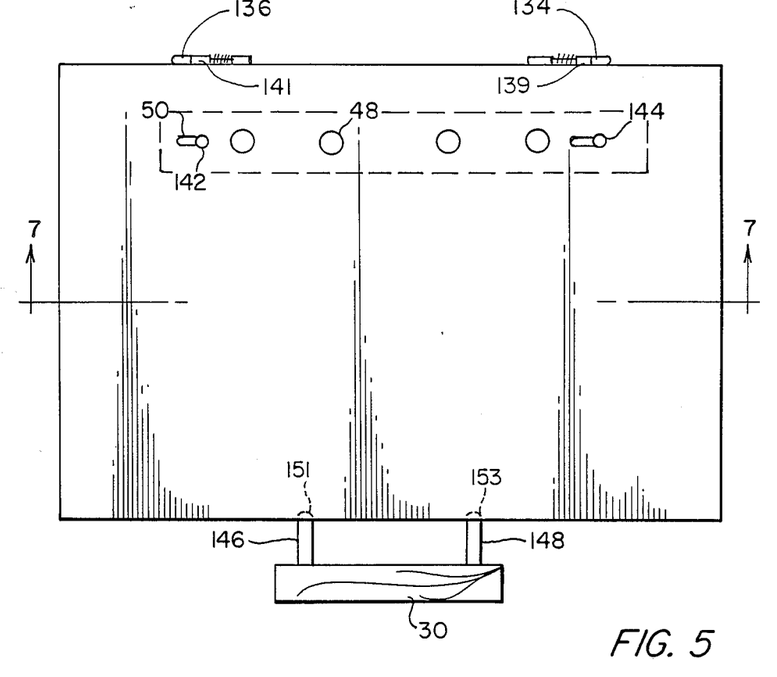
FIG. 5 is a top plan of the rectangular top cover.
Figure 6:
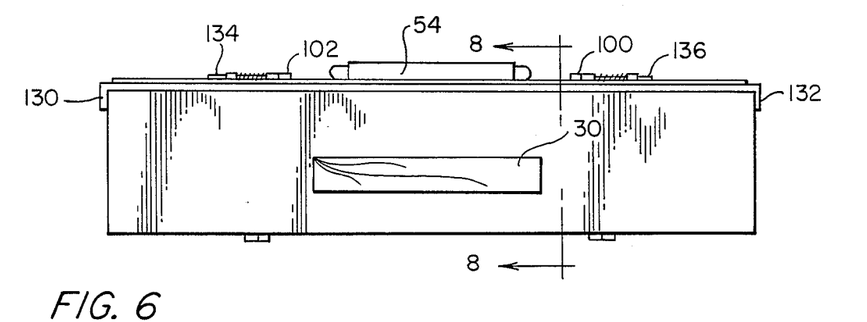
FIG. 6 is an end elevation of one of the upstanding sides of the top cover showing the grip handle protruding therefrom.
Figures 13, 16:
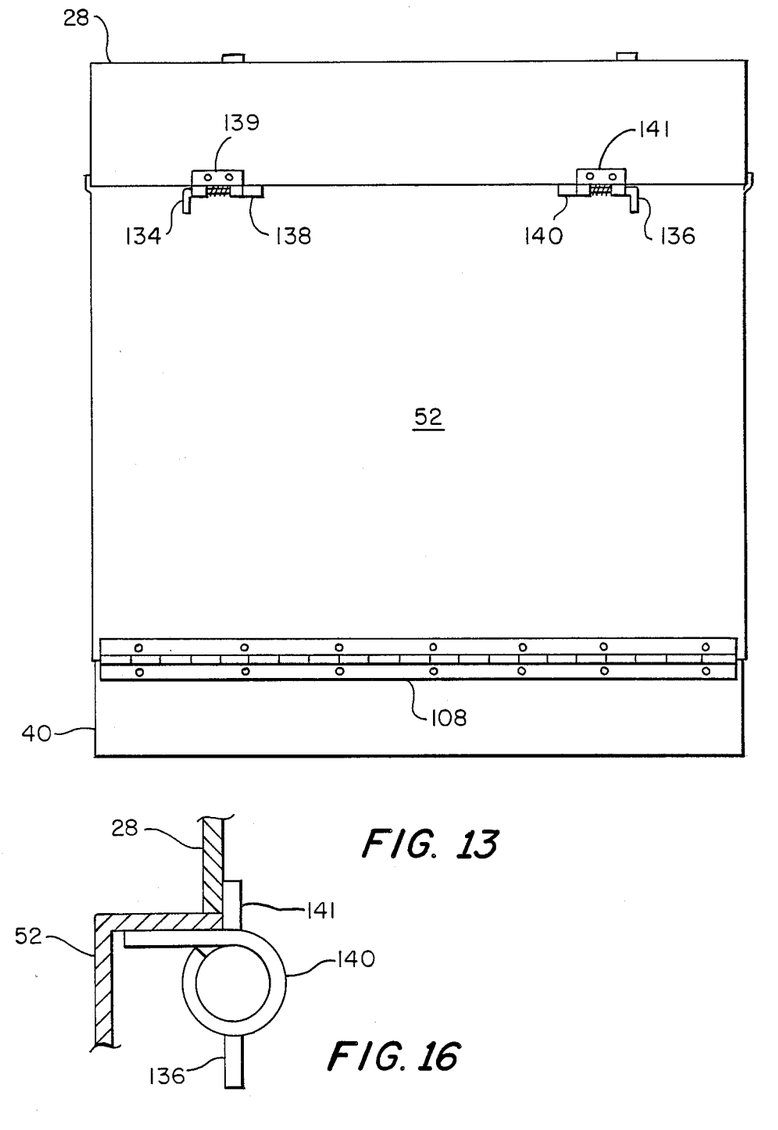
FIG. 13 is a rear elevation of the device.
FIG. 16 is an enlarged, fragmentary vertical of detent bracket 141, detent receptacle 140 and detent pin 136 securing rectangular top 28 to upstanding back 52.

As illustrated in FIGS. 3, 5 and 13, rectangular top 28 is hingedly secured to upstanding back 52 by means of detent members 136, 140 and 134, 138.

Figure 7:
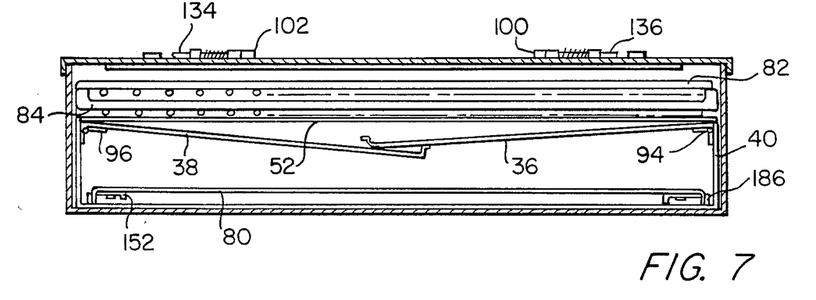
FIG. 7 is a transverse section of the device in disassembled mode, showing the front door covering the open front of the rectangular top cover with the cooking grills upstanding sides and back, as well as the baking pan nestled therein.

In FIG. 7, the portable cooking grill assembly is illustrated in disassembled mode wherein base pan 40 is supported within the rectangular top 28 with baking pan 80 at its bottom and its upstanding sides 36, 38 folded by means of hinges 94, 96 in overlapping relationship beneath back 52 and cooking grill grates 82, 84.

Figure 8:
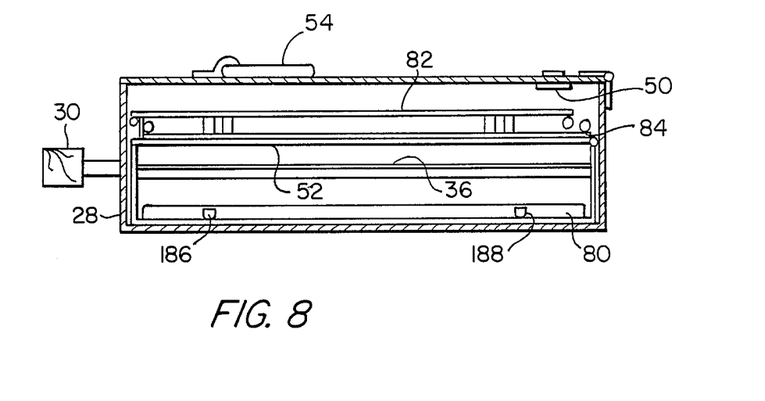
FIG. 8 is a transverse section of the top cover, front to back showing the grill in disassembled nested position as in FIG. 7.

FIG. 8 is a side sectional view of the disassembled assembly in a attache case carrying mode.

Figure 9:
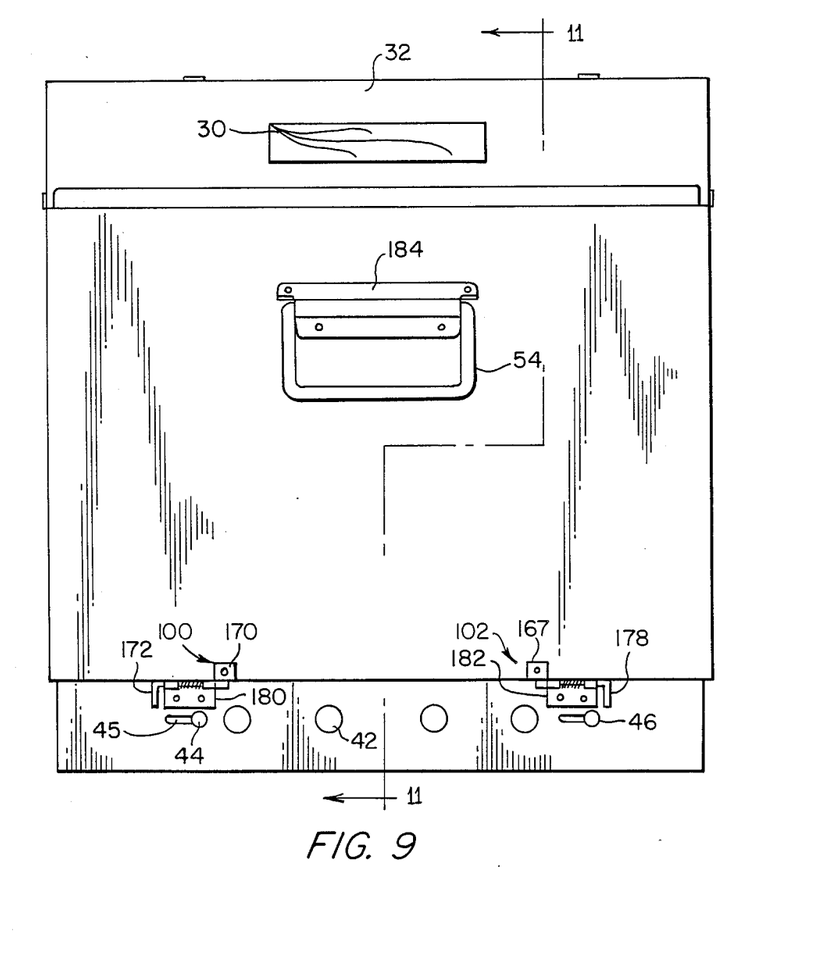
FIG. 9 is a front elevation of the cooking grill showing the front door connected by detent means to the pan base.

FIG. 9 is a front elevation of the assembly in a grilling, smoking or baking mode.

FIG. 10 is a vertical section of the assembled cooking grill in smoking mode showing the pairs of interior brackets defined on the upstanding back, 196, 198, 200, 202; 204, 206; 208, 210. A suggested, water filled smoking pan 201 is illustrated in phantom.

Figure 11:
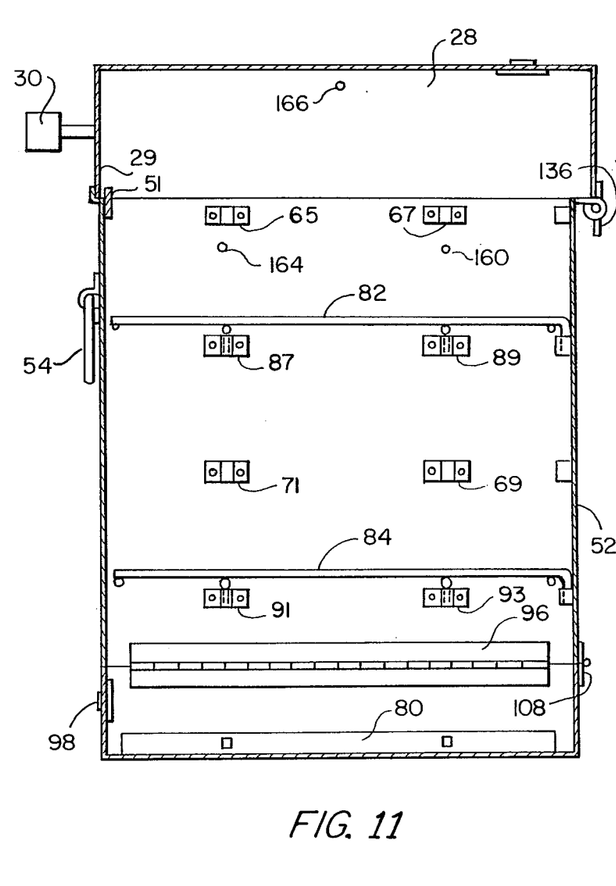
FIG. 11 is a vertical section front to back showing the positioning of the cooking grills as supported upon the interior brackets.

FIG. 11 is a side vertical elevation taken from front to back of the unit showing the pairs of brackets defined on the upstanding side 38, said brackets including 65, 67, 87, 89, 71, 69, and 91, 93. Side 38 is illustrated as hinge to the base pan by means of hinge 96. Inner lip or catch 51 extends across the inside of front door 34 as a retainer for the cover edge 29 of the rectangular top 28.

In FIG. 12 grating member 104 is illustrated as fitting within side wall bracket 86.

In FIG. 13 upstanding back 52 is shown as hingedly connected to base pan 40 by means of hinge 108 which may be fitted within or without.

Figure 14:
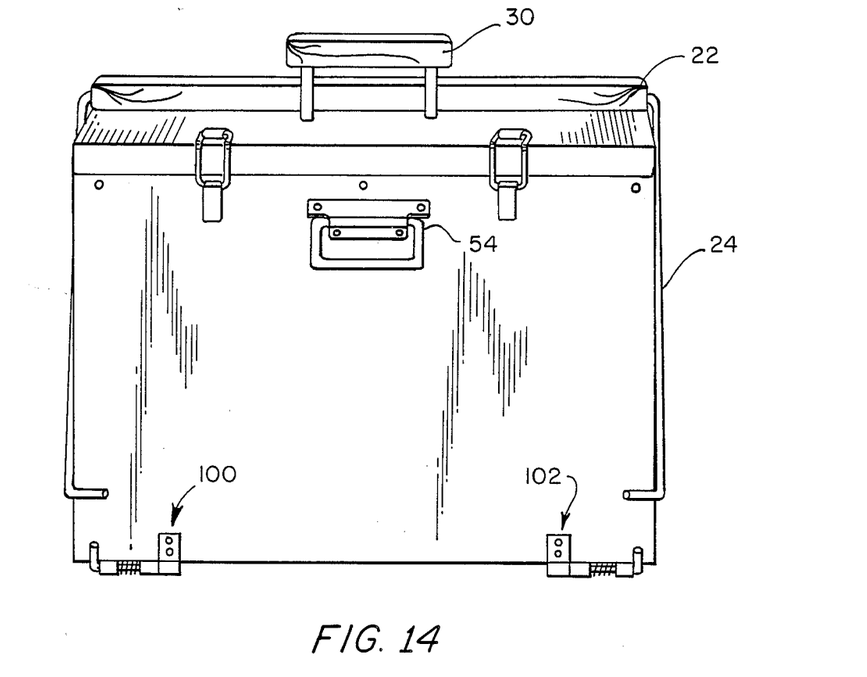
FIG. 14 is a front elevation showing the disassembled device as in FIGS. 4, 7 and 8.

In FIG. 14 the disassembled grill is indicated in carrying mode as an attache case configuration wherein wooden handle 30 extends above the front of the rectangular top adjacent the wooden carrying handle 22 and its struts 24, 26 which at their ends engage the front door of the rectangular top.

Figure 15:
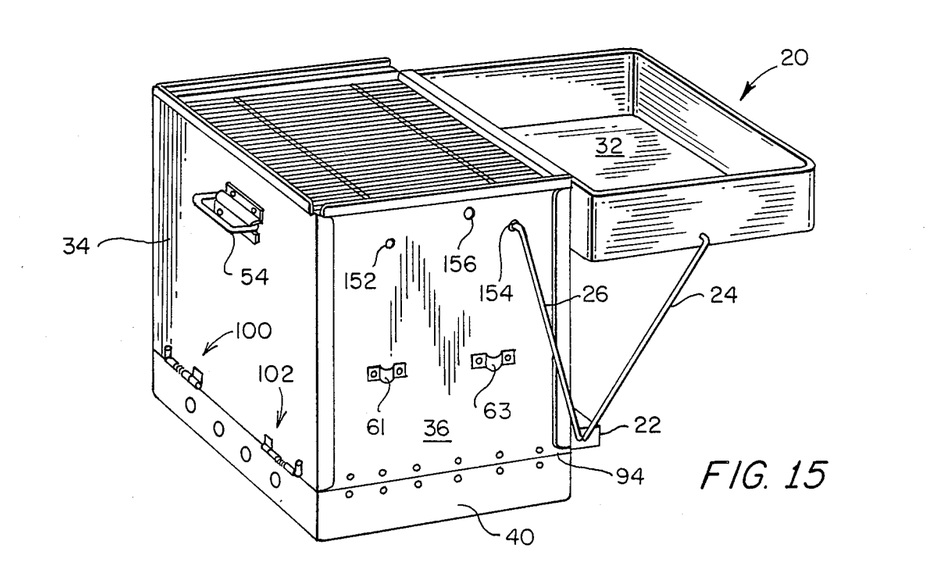
FIG. 15 is a perspective view of the device in open cooking top shelf mode wherein the top is supported in parallel with top of the upstanding sides and back.

In FIG. 15 the cooking assembly is illustrated in horizontal table top mode wherein the rectangular top may be used as a table for holding utensils for condiments and the like. Strut 24 engages holes 166 and 168 on either end of rectangular top 28, while wooden handle 22 nests against the back of oven base 40.

As will be apparent, the assembled cooking grill is rigidized by the interlocking of the cooking grills 82, 84 with the interior brackets defined on the upstanding sides and back, yet grills are easily rearranged for use with baking pan or oven baffle 80 in the baking or smoking mode. Cooking controls are provided by means of vents 42, 48 defined respectively in oven pan and the rectangular top. Alternatively, baking pan 80 may be supported in the oven pan base as a collector for ashes. The upstanding sides 38, 36 may have flipped edges 122, 120 such that the rectangular top 28 fits securely and rigidly between such edges 120, 122.

I claim:

1. A portable barbecue grill assembly capable of being folded into an attache carrying case configuration comprising:
   a. rectangular top cover in the form of an attache case having four upstanding closed sides, a closed back and an open front, together with a grip handle affixed on one side;
   b. a cooking oven supporting the top cover and including:
      i. a rectangular base pan;
      ii. left and right hand oven upstanding sides hingedly connected to said base pan and including interior bracket means for support of grills therebetween;
      iii. an upstanding back hinged to said base pan and including interior bracket members for supporting cooking grills, and
      iv. a front door releaseably and pivotally secured to said base pan, and
   c. a plurality of cooking grates including side and back studs respectively engaging said bracket means in said sides and back.

2. A portable barbecue grill assembly as in claim 1, said rectangular top cover being releaseably and pivotally secured to the top of said upstanding back.

3. A portable barbecue grill assembly as in claim 2, including a baking pan releaseably secured by detent means to complemental interior brackets defined in said upstanding sides.

4. A portable barbecue grill assembly as in claim 3, said grill including a disassembled mode wherein said cooking oven upstanding sides and upstanding back fold over within the enclosure formed by said base pan and said base pan is fitted within said rectangular top cover with said front door fitted upon the open front of said cover so as to form an attache type carrying case configuration.

5. A portable barbecue grill assembly as in claim 4, said grill in assembled mode including a carrying handle rotatably engaging a pair of struts extending over the rectangular top cover and engaging pairs of holes defined in the upstanding sides such that the assembled grill may be carried by grasping said carrying handle.

6. A portable barbecue grill assembly as in claim 4, said grill including an open cooking windshield mode, wherein said carrying handle abuts the closed back of said top and the ends of said struts engage pairs of holes defined in the upstanding sides, so as to support said top vertically and at right angles with respect to said oven.

7. A portable barbecue grill assembly as in claim 4, said grill including an open cooking top shelf mode, wherein the open top is supported in parallel with the top of the upstanding sides, upstanding back and front door while the carrying handle abuts the upstanding rear of said base and the ends of one strut engage holes in the upstanding sides and the ends of the other sides engage holes defined in the sides of said top cover.

8. A portable barbecue grill assembly as in claim 4, including at least one grate formed by pairs of side to side rods extending side to side between the oven sides and a plurality of back to front rods extending between the upstanding back and the front door back, said side to side rods engaging said interior bracket means in the upstanding sides and at least two back to front rods engaging exterior brackets in the back and front door of said oven.

9. A portable barbecue grill assembly as in claim 8, including an adjustable vent defined in the front of said oven base.

10. A portable barbecue grill assembly as in claim 8, including an adjustable vent defined in the rectangular top cover.

11. A portable barbecue grill assembly as in claim 3, wherein said baking pan may be supported as an ash pan within the bottom of said over base.

* * * * *